J. ROEH.
PROCESS OF DRYING MILK.
APPLICATION FILED MAR. 14, 1910.
1,235,161.
Patented July 31, 1917.
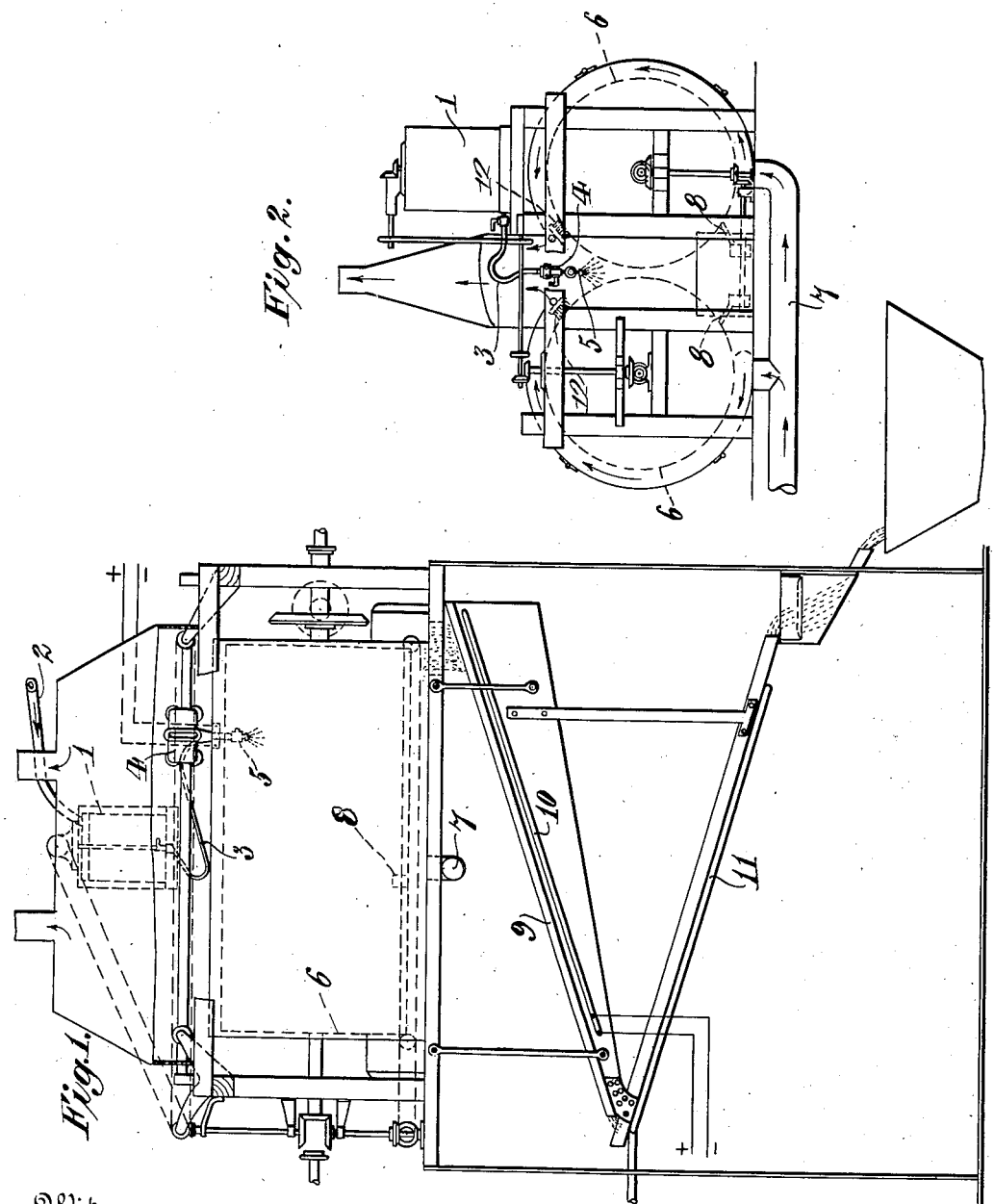

UNITED STATES PATENT OFFICE.

JOHN ROEH, OF SPOKANE, WASHINGTON, ASSIGNOR TO CRYSTALLIZED MILK COMPANY, OF SPOKANE, WASHINGTON, A CORPORATION OF WASHINGTON.

PROCESS OF DRYING MILK.

1,235,161.      Specification of Letters Patent.      Patented July 31, 1917.

Application filed March 14, 1910. Serial No. 549,276.

*To all whom it may concern:*

Be it known that I, JOHN ROEH, a citizen of the United States, residing at Spokane, in the county of Spokane and State of Washington, have invented certain new and useful Improvements in Processes of Drying Milk, of which the following is a specification.

The object of this invention is to produce a dried milk product without breaking the butter globules and which shall be soluble in warm water to produce a natural milk having its chemical and physical properties unchanged. A further object of the invention is to provide a process wherein the milk shall be converted into a dry powder in a relatively short space of time and at a comparatively low temperature, so as to prevent chemical or physical changes from taking place.

According to my improved process fresh milk in its natural state is preferably subjected to a pressure of approximately 25 lbs. to the square inch for the purpose of forcing said milk to and through a distributing or spraying nozzle to be hereinafter described. While under pressure a small portion thereof, preferably in the form of a continuous stream, is heated almost instantaneously by any suitable heating mechanism to a temperature of approximately 90 degrees F. for the purpose of preheating the milk and at the same time enable the water in the milk to be quickly evaporated when the milk is spread upon the heated rotating cylinders to be presently described. The heated milk is then spread in a thin layer and heated to about 140 and not over 160 degrees F., preferably by being spread evenly upon a surface heated to this temperature. The layer of milk may at the same time be subjected to the action of a current of air which is heated to the same or approximately the same temperature. As soon as a sufficient percentage of the water has been removed to reduce the layer of milk to a solid condition, said layer is then pulverized in any suitable manner. The resulting product which is a fine fluffy powder is subjected to a temperature of approximately 170 degrees F., for a very brief space of time, preferably by being passed rapidly over a surface heated to this temperature. Then the product is rapidly cooled, preferably by being brought into contact with a body having a large radiating surface until it is at atmospheric temperature, whereupon it may be packed in boxes for shipment.

In the accompanying drawings one form of apparatus is indicated diagrammatically for carrying out my improved process, in which Figure 1 represents a front elevation and Fig. 2 represents an end elevation of the apparatus, respectively.

Referring to said drawings, the fresh milk in its natural state is contained in a suitable receptacle 1 which is inclosed so that the milk can be subjected to a suitable pressure in any suitable manner as by compressed air, which may be introduced into the receptacle through a pipe 2. The milk is conducted from said receptacle in a continuous stream preferably through a small tube 3 to a traveling heater 4 in which the temperature may be controlled in any suitable manner as by a current of electricity. The heater is provided with a suitable nozzle 5 which spreads the milk in a thin layer on rotating cylinders 6 which may be heated in any well known manner. At the same time the layer of milk is subjected to the action of a current of air which is supplied through a suitable pipe 7. The brushes 12 serve to spread the milk uniformly upon the cylinders 6, and also break up the skin that would otherwise form upon the exposed surface and thereby prevent quick evaporation of the water within the milk. The application of said brushes may be intermittent as desired depending upon the quality and character of the milk and rapidity of evaporation of the water.

After the layer of milk has been dried to the desired condition, it is removed from the cylinders and simultaneously pulverized by any suitable means as the traveling scrapers 8, as shown, which reduce the partly dried product substantially to the form of a powder. The pulverized milk falls directly from the cylinders 6, upon an inclined plate 9, which is heated in any suitable manner as by an electric radiator 10. From said heated plate the desiccated and pulverized milk passes to a cooling plate 11, having a large radiating surface, so that it may be cooled rapidly at atmospheric temperature.

By the foregoing method, I am enabled to dry milk upon the cylinders 6, 6, at a low temperature, for the reason that I can operate the machine at a speed that will permit the drying of the milk to any desired consistency without in any way injuring any of the food products in it. The resultant product will be soluble, and chemically and physically unchanged; and when water in proper quantities is added, the result is liquid milk with all solids in suspension.

By means of this process I am enabled to completely dry the milk and reduce same to the form of a powder in a very short space of time, so that all chemical changes in the milk are avoided. My process also preserves the physical properties of the milk and consequently when the milk powder produced by my process is added to a suitable quantity of water it is completely dissolved and a true milk is reproduced which has all of the physical and chemical characteristics of fresh milk, which will produce cream, which will turn sour and which will undergo all other changes and tests characteristic of fresh milk. The milk is at no time subjected to a high temperature and most of the steps are conducted in a temperature at or but slightly above normal atmospheric temperature.

I claim as my invention:

1. The process of drying milk which consists in spreading the same in a thin layer upon a surface heated approximately to 140 degrees F., subjecting same to the action of a current of air heated to approximately the same temperature, reducing same to a firm but flexible product, then subjecting the same momentarily to a temperature approximately 170 degrees F., and then rapidly cooling the same to atmospheric temperature.

2. The process of drying milk which consists in warming the same practically instantaneously to a temperature of approximately 90 degrees F., spreading the same in a thin layer on a surface heated approximately to 140° F. and reducing same to a practically solid product, subjecting same to the action of a surface heated to a higher temperature than the first mentioned surface, and then cooling the product to atmospheric temperature.

3. The process of drying milk comprising three heating steps in succession, first, the practically instantaneous warming of a small quantity of the milk under a pressure greater than atmospheric pressure, the heating of the warm milk at a temperature of approximately 140° F. until it is dry and finally subjecting the same to a final heating of substantially 170° F.

This specification witnessed this 28th day of February A. D., 1910.

JOHN ROEH.

Signed in the presence of—
WILLIAM J. C. WAKEFIELD,
CHARLES P. ROBBINS.